United States Patent [19]

Hamano

[11] 4,412,227
[45] Oct. 25, 1983

[54] THERMAL HEAD

[75] Inventor: Toshihisa Hamano, Kanagawa, Japan

[73] Assignee: Fuji Xerox Co., Ltd., Tokyo, Japan

[21] Appl. No.: 386,823

[22] Filed: Jun. 9, 1982

[30] Foreign Application Priority Data

Jun. 10, 1981 [JP] Japan .................................. 56-88043

[51] Int. Cl.³ ............................................. G01D 15/10
[52] U.S. Cl. .................. 346/76 PH; 307/311
[58] Field of Search ................... 346/76 PH; 307/311; 322/123, 124

[56] References Cited

U.S. PATENT DOCUMENTS

| | | | |
|---|---|---|---|
| 4,206,541 | 6/1980 | Marciniec | 346/76 PH |
| 4,259,564 | 3/1981 | Ohkubo et al. | 346/76 PH |
| 4,296,309 | 10/1981 | Shimi et al. | 346/76 PH |
| 4,296,331 | 10/1981 | Rodriguez | 307/311 |
| 4,298,786 | 11/1981 | Marciniec | 346/76 PH |
| 4,329,625 | 5/1982 | Nishizawa et al. | 307/311 |
| 4,335,968 | 6/1982 | Regnault | 346/76 PH |
| 4,343,968 | 8/1982 | Toyomara | 346/76 PH |
| 4,346,449 | 8/1982 | Oushinsky et al. | 346/76 PH |

FOREIGN PATENT DOCUMENTS 53-72632  6/1978  Japan .

Primary Examiner—Joseph W. Hartary
Assistant Examiner—Derek Jennings
Attorney, Agent, or Firm—Sughrue, Mion, Zinn, Macpeak and Seas

[57] ABSTRACT

A thermal head reading/writing device includes a thin-film transistor element which may be switchably operated for printing in response to the variation of a signal voltage applied to a gate electrode.

4 Claims, 5 Drawing Figures

THERMAL HEAD

BACKGROUND OF THE INVENTION

This invention relates to thermal heads capable of reading and/or writing optical images, and more particularly to a thermal head in which a reading section is coupled to a writing section through a thin film transistor, so that, even when the reading section produces a very small level signal, an output large enough to drive the writing section can be provided by switching the coupling transistor.

In many output devices utilizing conventional thermal heads, a reading device and a thermal printing head, which is a recording device, are separately arranged, and video signals are transmitted and received spatially separately.

Sometimes, a facsimile device capable of transmitting and receiving video signals is employed as a copying machine.

However, in many cases, two devices, namely, a reading device and a reproducing device must be provided, which not only increases the manufacturing cost but also results in an uneconomical waste of space. This drawback may be eliminated by forming the thermal head and a picture reading photo-sensitive element into one unit. However, this method causes another problem in that the service life is decreased, because the photo-sensitive element is greatly deteriorated by generated heat.

In order to overcome these difficulties, a device has been disclosed by Japanese Patent Application No. 37033/1979 in which a signal from a reading device is used directly as a current in the thermal head output device. Therefore, the head itself must be a photo-conductor which can supply current sufficiently, which limits kinds of materials which can be used for manufacturing the device. Thus, the conventional device is not practical.

The conventional device suffers from another problem in that the light receiving element is deteriorated by the heat generated because a large current for driving the heat-sensitive head flows in the light receiving element.

SUMMARY OF THE INVENTION

Accordingly, an object of this invention is to provide a thermal head in which the above-described difficulties have been eliminated, and in which a variety of photoconductors can be employed, and which can perform an optical reading and/or writing operation.

The foregoing object of the invention is achieved by applying the output voltage of a reading element to the gate of a TFT (thin film transistor), and switching a supply voltage with the source and drain thereof to supply the same to a heat generating element.

DETAILED DESCRIPTION OF THE PREFERRED EMBODIMENTS

Figure 1:
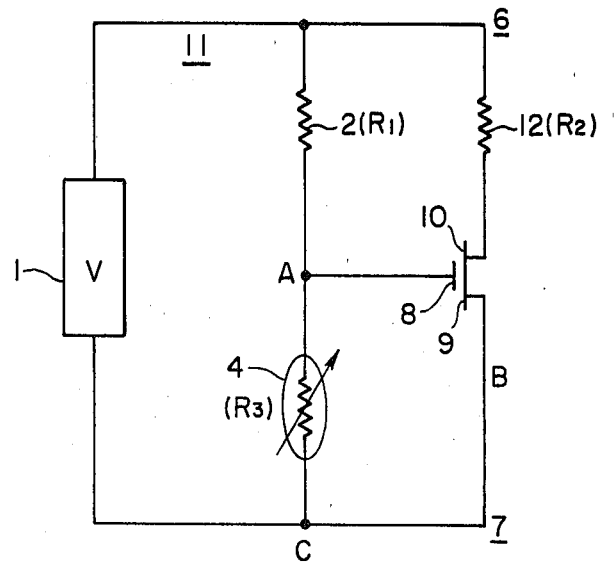
FIG. 1 is a circuit diagram showing an equivalent circuit of fundamental components forming a thermal head according to this invention.

The thermal head according to this invention includes, as shown in FIGS. 1-4, a transparent substrate 14 and a transparent electrode 7 formed on the transparent substrate and connected to a heat generating resistor driving power line 7'. A photo-conductive layer 15 is formed on the transparent electrode, and a photo-sensor confronting electrode 11 is formed on this photo-conductive layer. A gate electrode 8 is formed directly on the confronting electrode and through an insulating film 18 on the photo-conductive layer. A thin film transistor (TFT) semiconductor 16 is formed through a gate insulating film 17 on the gate electrode, and a source electrode 9 is formed on the thin film transistor semiconductor 16 and is connected to the power line 7' for driving the heat generating resistor 12. A drain electrode 10 is formed on the thin film transistor semiconductor, isolated from the source electrode and connected to the heat generating resistor. Finally, a driving power line 6 is connected to the heat generating resistor. The operation of the device as constructed above will now be described.

In FIG. 1, the potential $V_A$ at a circuit point A can be represented by the following expression:

$$V_A = \frac{R_3}{R_1 + R_3} V$$

where V is the voltage of an electric source 1, $R_1$ is the internal resistance of the driving power line, and $R_3$ is the internal resistance of a light receiving element.

Since the light receiving element is a photo-conductive element, the resistance $R_3$ of the element when light is incident thereupon is different by three to four decimal places or orders of magnitude from that exhibited when the light is intercepted.

If $R_1 = 10^5 \Omega$, and $R_3$ is $10^3 \Omega$ during the application of light and $10^7 \Omega$ otherwise, then during the application of light:

$$V_A = \frac{10^3}{10^5 + 10^3} V \simeq \frac{1}{100} V$$

and when the light is intercepted:

$$V_A = \frac{10^7}{10^5 + 10^7} V \simeq V$$

Therefore, if V is set to a suitable value with respect to the threshold voltage of a switching thin film transistor, then switching will be effected between the source electrode 9 and the drain electrode 10 of the thin film transistor in response to the variation of a signal voltage applied to the gate electrode 8' that is, the thin film transistor is rendered non-conductive when light is applied to the photo-sensor confronting electrode 11, and is rendered conductive when the light is intercepted. Therefore, only when no light is applied to the photo-sensor confronting electrode 11, a voltage is applied to the heat generating resistor 12($R_2$) and a heat-sensitive sheet on a wear resistant layer side is accordingly printed black.

One example of the thermal head of the invention will be described.

Figure 2:
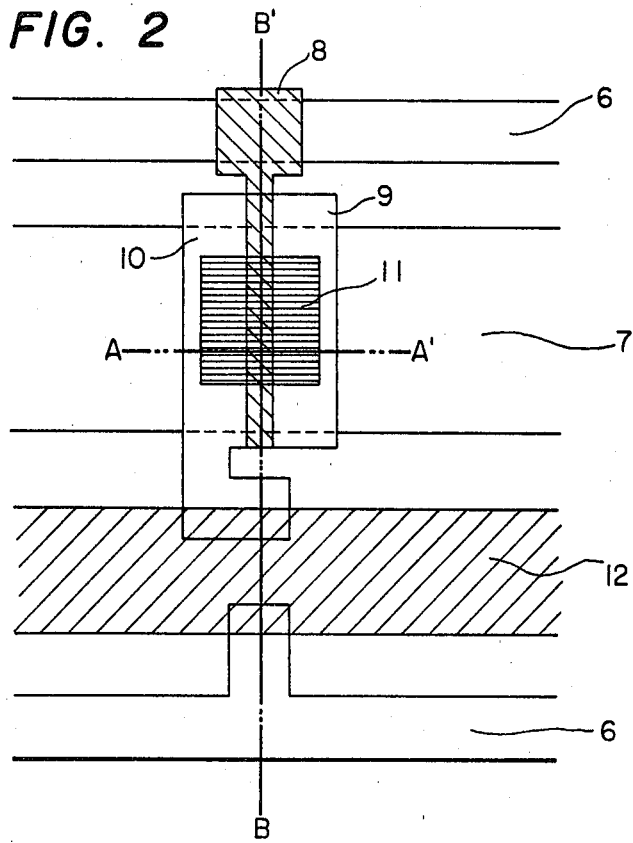
FIG. 2 is a plan view of the fundamental components of the thermal head according to the invention.
Figure 3:
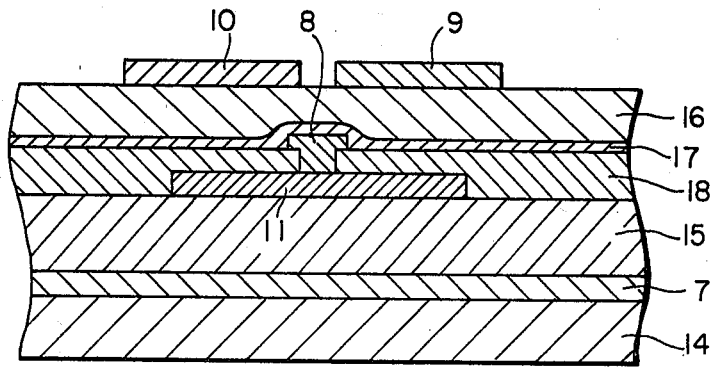
FIG. 3 is a sectional view taken along the line A-A' of FIG. 2.
Figure 4:
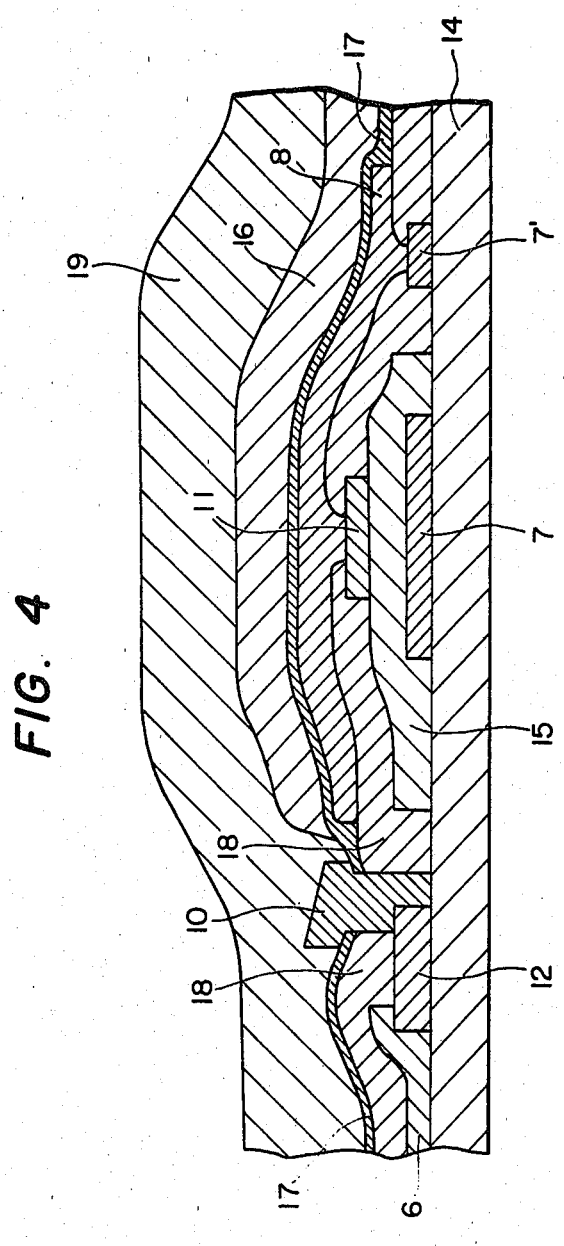
FIG. 4 is a sectional view taken along the line B-B' of FIG. 2.

FIG. 2 is a plan view showing the design of an element of the thermal head according to the invention. FIG. 3 is a sectional view taken along the line A–A', and FIG. 4 is a sectional view taken along the line B–B'.

The thermal head according to the invention, as shown in FIG. 2, comprises a heat generating section and a reading and switching section. Therefore, in the thermal head of the invention, unlike the conventional device, no thermal head driving current flows in the light receiving element, which protects the light receiving element from deterioration due to the heat generated.

The steps of forming the thermal head according to the invention will now be described.

The heat generating resistor 12 (made of $Ta_2N$, W, $SnO_2$ or the like), the transparent electrode 7 (made of $SnO_2$, ITO or the like) and the power lines 6 and 7' (composed of Cr-Au, Ni-Cr-Cu or the like) are formed on the glass substrate 14. In succession with this formation, the photo-conductive layer 15 (composed of Se-Te-As, CdS, a-Si or the like) is formed and the confronting electrode 11 (of Al or the like) is formed. After the inter-layer insulating film and resistor projecting layer 18 (formed of SiN, SiO, $SiO_2$, SiON or the like) is deposited, a through-hole is cut and the gate electrodes 8 of the switching transistor is formed. Then, the thin film transistor semiconductor semiconductor layer 16 (of CdSe, CdS, a-Si or the like) is formed, after the formation of an insulating film 17 (of $SiO_2$, $Si_3N_4$ or the like).

Thereafter, a contact hole is cut in the heat generating resistor by photo-lithography, and the drain electrode 10 is formed, again via a photo-lithographic process. At the same time, the source electrode is connected to the transparent electrode 7, which is connected to the power line 7'. After a passivation film is formed thereon, the above mentioned wear resistant layer 19 (of $Ta_2O_5$, SiN, SiC, Cr, Ti or the like) is formed to a thickness of about 70 $\mu$.

Figure 5:
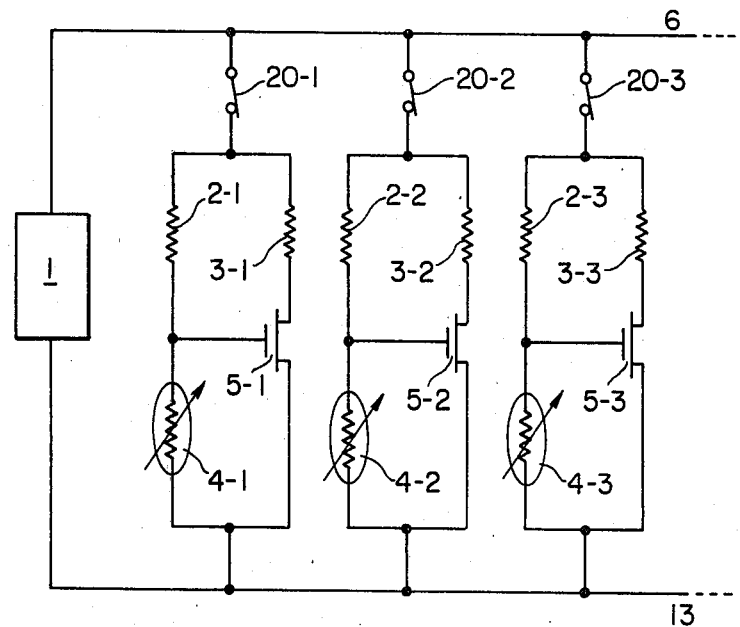
FIG. 5 is a circuit diagram showing an equivalent circuit of the entire arrangement of the thermal head according to the invention.

FIG. 5 shows an equivalent circuit of the thermal head according to the invention. In FIG. 5, switches 20-1 through 20-3 are all turned on in reading data in real time, and are turned on successively in reading data in raster scanning.

The reading operation of this device is carried out with light applied to the glass substrate 14, and the heat-sensitive recording sheet writing operation of the thermal head is carried out on the side of the wear-resistant layer 19 (FIG. 4).

As is clear from the structure of the thermal head of the invention, the thermal head can be employed as a single function device; i.e., as a thermal head or as a reading device.

In the case where the thermal head is employed as a reading device, a signal can be readily obtained without amplification by detecting the current which flows through the circuit point B in FIG. 1. In the case where it is used as an ordinary thermal head, the reading device is disconnected with switching means, and a printing signal is applied to the circuit point A in FIG. 1.

What is claimed is:

1. A thermal head having reading and thermal printing sections, comprising;
   electrode (7) connected to a heat generating resistor driving power line (7') formed on a substrate (14):
   a photo-conductive layer (15) formed on said electrode;
   photo-sensor electrode means (11) formed on said photo-conductive layer;
   a gate electrode (8) connected to said photo-sensor electrode means;
   thin film transistor (TFT) semiconductor means (16) formed, through a gate insulating film (17), on said gate electrode;
   a source electrode formed on said thin film transistor semiconductor and connected to said power line (7') for driving a heat generating resistor (12);
   a drain electrode (10) formed on said thin film transistor semiconductor so as to be isolated from said source electrode, said drain electrode being connected to said heat generating resistor (12); and
   a driving power line (6) connected to said heat generating resistor.

2. A thermal head as claimed in claim 1, wherein said electrode (7) and said substrate (14) are transparent, whereby light applied from the side of said substrate falls on said photo-conductive layer.

3. A thermal head as claimed in claim 1, further including a wear resistant layer (19) provided over said semiconductor, for contacting a heat-sensitive recording sheet during printing.

4. A thermal head as claimed in claim 1, said gate electrode being formed over said photo-conductive Layer (15) and an insulating film being disposed between said gate electrode and said photoconductive layer.

* * * * *